United States Patent [19]

Eager et al.

[11] Patent Number: 4,784,213

[45] Date of Patent: Nov. 15, 1988

[54] MIXING VALVE AIR SOURCE

[75] Inventors: George Eager, Cambridge, Mass.; Thomas J. Schey, Woonsocket, R.I.; Peter Selverstone, Cambridge, Mass.

[73] Assignee: Temptronic Corporation, Newton, Mass.

[21] Appl. No.: 849,532

[22] Filed: Apr. 8, 1986

[51] Int. Cl.⁴ .................. G05D 23/19; G05D 23/13; F25B 29/00

[52] U.S. Cl. .................................. 165/2; 165/30; 165/34; 165/36; 165/61; 165/64; 165/101; 62/175; 62/335; 236/13; 219/481

[58] Field of Search ............... 165/12, 22, 30, 101, 165/36, 61, 63, 64, 34; 236/13; 62/175, 335; 219/481, 485, 494

[56] References Cited

U.S. PATENT DOCUMENTS

| | | | |
|---|---|---|---|
| 2,788,264 | 4/1957 | Bremer et al. | 165/22 |
| 3,274,995 | 9/1966 | Eidus | 128/2 |
| 3,618,590 | 11/1971 | Yardley et al. | 128/2 R |
| 3,645,697 | 2/1972 | Hoffman, Jr. | 165/36 |
| 3,691,840 | 9/1972 | Dufour et al. | |
| 3,729,064 | 4/1973 | Wolf et al. | 165/34 |
| 3,734,081 | 5/1973 | Schaack | 128/2 N |
| 3,782,366 | 1/1974 | Brown | 128/2.1 R |
| 3,785,432 | 1/1974 | Kabat et al. | 165/22 |
| 3,788,386 | 1/1974 | Demaray | 165/22 |
| 3,826,963 | 7/1974 | Lorenz | 165/22 |
| 3,841,311 | 10/1974 | Brown | 128/2.1 R |
| 3,948,269 | 4/1976 | Zimmer | 128/303.1 |
| 3,979,671 | 9/1976 | Meeker et al. | |
| 4,102,150 | 7/1978 | Kountz | |
| 4,112,589 | 9/1978 | Palfrey et al. | |
| 4,164,214 | 8/1979 | Stark et al. | 128/741 |
| 4,215,698 | 8/1980 | Nuwayser | 128/734 |
| 4,249,899 | 2/1981 | Davis | 433/32 |
| 4,286,391 | 9/1981 | Gerry | |
| 4,308,012 | 12/1981 | Tamler et al. | 433/32 |
| 4,308,013 | 12/1981 | Major | 433/32 |
| 4,350,488 | 9/1982 | Davis | 433/32 |
| 4,381,814 | 5/1983 | Funk | 165/34 |
| 4,397,101 | 8/1983 | Richard | |
| 4,426,619 | 1/1984 | Demand | |
| 4,437,771 | 3/1984 | Cazzantga | |
| 4,484,449 | 11/1984 | Muench | 62/175 |
| 4,604,572 | 8/1986 | Horivchi et al. | |

OTHER PUBLICATIONS

Robert J. Bibbero, "Microprocessors in Instruments and in Control", John Wiley & Sons, New York, 1977, pp. 155-175.

Katsuhiko Ogato, "Modern Control Engineering", Prentice-Hall Inc., Englewood Cliffs, NJ 1970, pp. 151-159.

Primary Examiner—Albert W. Davis, Jr.
Assistant Examiner—John K. Ford
Attorney, Agent, or Firm—Schiller, Pandiscio & Kusmer

[57] ABSTRACT

An improved system for and method of precisely controlling the temperature at a predetermined location at a preselected temperature selected from a range of temperatures is described. The preferred system for carrying out the preferred method includes a mixing valve for separating a fluid stream into first and second component streams and adjustable in response to a first contol signal so as to control the amount of separation of first and second component streams. The preferred system also includes a heater for heating the first component stream in response to a second control signal, a first evaporator for cooling the second component stream and a conduit for combining the heated and cooled component streams so as to provide a mixed stream to the predetermined location. The first and second control signals are provided as a function of the preselected temperature, the temperature of the heated first component stream, the temperature of the mixed stream and the temperature at said predetermined location. The system is also preferably provided with a second evaporator for recooling the mixed stream as it is recirculated if the temperature at the predetermined location does not drop below some predetermined level. The second evaporator provides partial recooling of the mixed stream when the temperature difference between the preselected temperature and the temperature at the predetermined location is below some preselected value and maximum recooling when above the preselected value so long as the temperature at the predetermined location does not drop below the predetermined level.

18 Claims, 2 Drawing Sheets

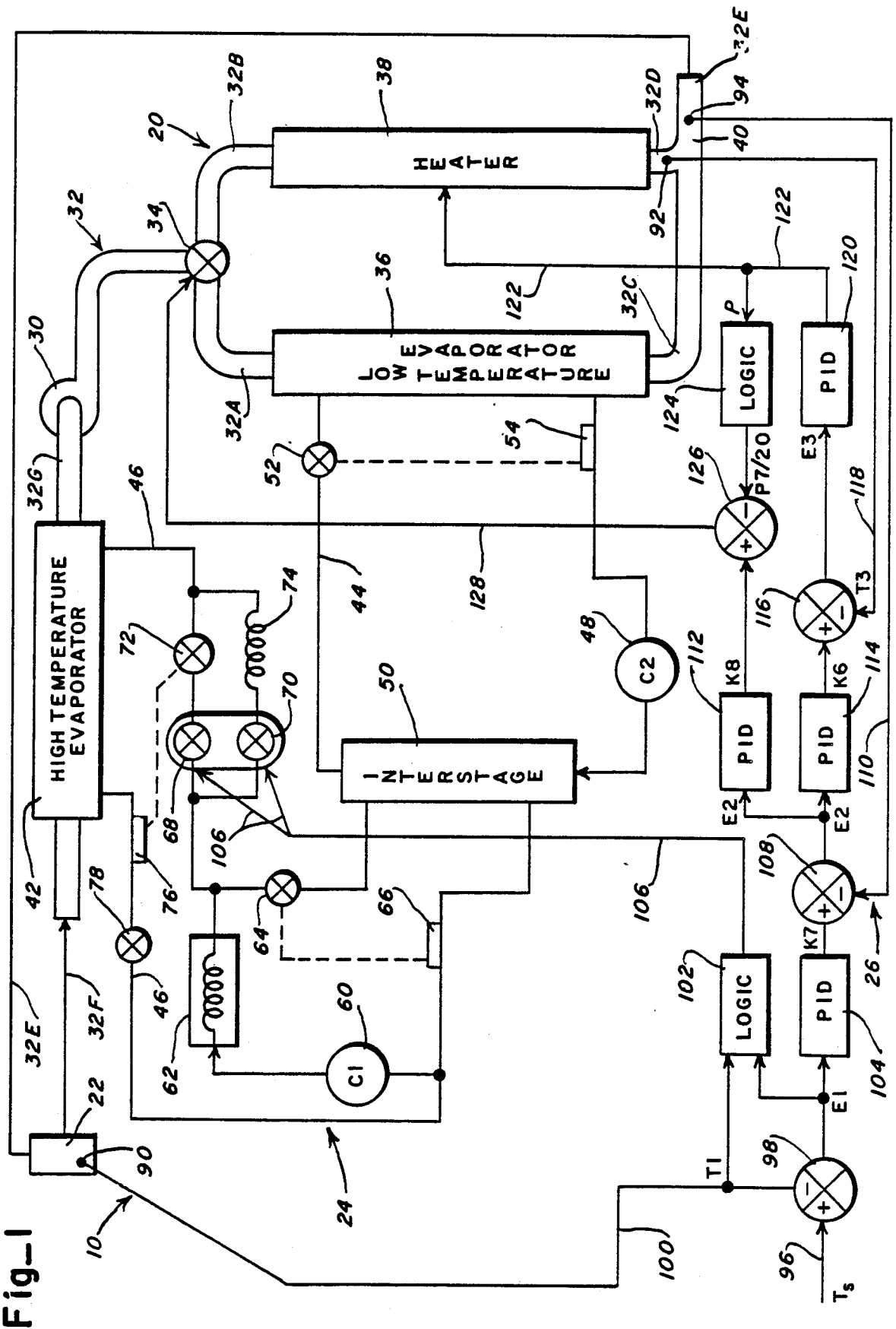
Fig_1

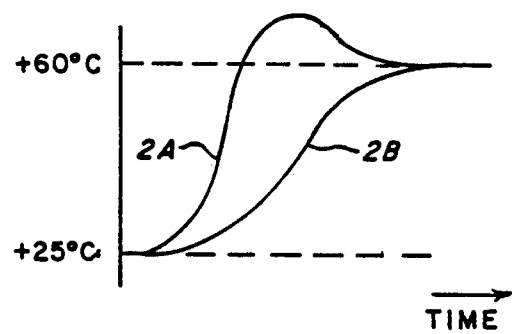
Fig_2
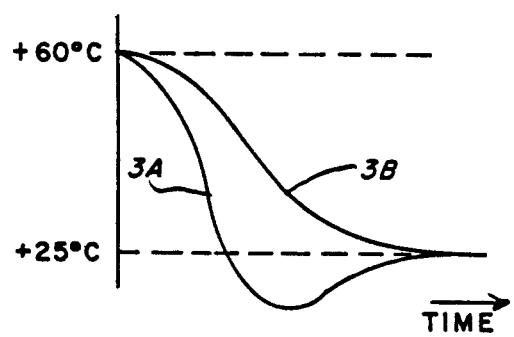
Fig_3
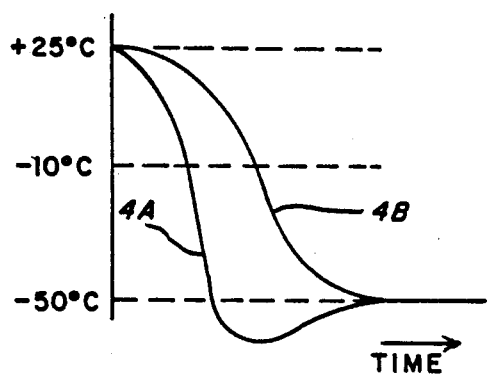
Fig_4

MIXING VALVE AIR SOURCE

The present invention relates generally to a system for and method of controlling the temperature of a pressurized fluid at a specific location and, more particularly, to a system for and method of controlling the temperature of a pressurized fluid at a specific test site by controlling the mix and temperature of hot and cold streams of the pressurized fluid in an economical and energy efficient manner.

It is often important to test various objects (such as electrical component devices, e.g., wafers, integrated circuits, printed circuits, hybrid circuits, as well as small systems using such electrical component devices, e.g., pacemakers) at various temperatures throughout a range of temperatures, e.g., between about −70° C. and 80° C. When conducting such tests it is important that the temperature at the site where the object is tested be as accurately controlled as possible in order to insure accurate testing results at the various test temperatures set by the operator.

Various systems have been devised to carry out such tests. One type of currently marketed system cools the pressurized fluid to the lowest desired temperature, and subsequently reheats the fluid to the desired temperature. This type of system includes a single temperature sensor, located at the site of the object under test. A single temperature controller responsive to the single sensor raises or lowers the temperature of the fluid in order to bring and maintain the sensed temperature at the sensor location at the temperature set by the operator.

The sensor must be at and the heater must be as close as possible to the test site to assure good temperature control and substantially reduce or eliminate temperature losses between the heater and test site. In addition, this approach is wasteful of energy since it is necessary to first cool the stream to the lowest temperature of the range and then reheat it. The approach is particularly wasteful of energy where the stream is recirculated in a closed loop configuration, i.e., the fluid stream is constantly recirculated through the test site. In the latter situation, the reheated fluid places unreasonable stress on any refrigeration system used by returning a high temperature fluid to the cooling section of the system. As a consequence, this approach requires a much larger refrigeration system than necessary for the designed thermal load in order to recool a returned high temperature fluid.

Another type of system for controlling the temperature at a test site includes a heat source and heat sink for separately maintaining the temperature of first and second fluid streams at or near the respective highest and lowest temperatures of the desired range of temperatures, and a mixing valve for mixing the first and second fluid streams in a preselected ratio solely dependent on the temperature sensed by a sensor located at a preselected position within the system. If the sensor is located in the mixed stream just downstream from the mixing valve, a very precise valve control device is required to achieve good temperature control at the position of the sensor, but temperature losses between the sensor position and the test site are not compensated for at the test site. As a result, the actual temperature of the object under test may not be the same as the desired set temperature.

If the sensor is placed at the test site the temperature control will be poor with a long temperature stabilization time required after each temperature change to damp out temperature oscillation at the test site.

Recirculating the fluid stream of such a mixing valve system in a closed loop configuration results in the high temperature fluids returning from the test site stressing the refrigeration system unduly and requiring a relatively large capacity refrigeration system.

An additional problem with these prior art systems is that the transition time necessary for the temperature to stabilize at the sensor site to the set temperature is relatively long. Further, the relatively large refrigeration and heater systems employed are relatively large energy consumption devices and thus are energy inefficient. As the high temperature fluid is returned from the test site it places a great deal of stress on the refrigeration system. With a single sensor and controller to control the temperature of the fluid stream, the system is capable of providing exact temperature control at the sensor site.

A system, commercially available from the present assignee, Temptronic Corporation of Newton Mass., is the Model 412 with the DUT Option, includes two sensors connected to a single controller, wherein one sensor is placed in the fluid stream, the other adjacent the object under test, for more accurately controlling the temperature of the object under test. This system is described in greater detail in U.S. patent application Ser. No. 728,860 filed Apr. 30, 1985 in the name of the present inventors, George Eager and Peter Selverstone, and assigned to the present assignee.

It is a general object of the present invention to provide a temperature controlled fluid stream system designed to substantially reduce or overcome the above-noted disadvantages of the prior art.

A more specific object of the present invention is to provide a temperature controlled fluid stream system designed to substantially reduce the possible temperature transition times for the temperature at the test site to stabilize at a temperature set by the operator.

Another object of the present invention is to provide an improved temperature controlled fluid stream system designed to control the temperature of the fluid stream at several locations of the stream.

And another object of the present invention is to provide an improved temperature controlled fluid stream apparatus of the type including refrigeration and cooling systems, the apparatus being designed to reduce the thermal stress on the refrigeration system.

Yet another object of the present invention is to provide a more energy efficient temperature controlled fluid stream system than provided by the prior art devices.

Still another object of the present invention is to provide a temperature controlled fluid stream apparatus of the type including heating and cooling systems designed respectively to provide a heat output and refrigeration capacity tailored for more efficient operation than provided in the prior art devices.

These and other objects are achieved by an improved system for precisely controlling the temperature at a predetermined location at a preselected temperature selected from a range of temperatures. The system comprises:

means for generating a pressurized stream of fluid;
means for separating said stream into first and second component streams;

heating means responsive to a first control signal for heating said first component stream;

cooling means for cooling said second component stream;

mixer means for mixing said first and second component streams so as to provide a mixed stream;

control means responsive to a second control signal for controlling the relative mix of said first and second component streams;

means for carrying said mixed stream to said location; and signal generating means for generating said first and second control signals as a function of the preselected temperature, the temperature of said said first component stream downstream from said heater means, the temperature of said mixed stream and said temperature at said predetermined location.

In accordance with another aspect of the present invention, a method is provided for precisely controlling the temperature at a predetermined location at a preselected temperature selected from a range of temperatures. The method comprises the steps of:

generating a pressurized stream of fluid;

separating said stream into first and second component streams;

heating said first component stream in response to a first control signal;

cooling said second component stream;

mixing said first and second component streams so as to provide a mixed stream;

controlling the relative mixing of said first and second component streams in response to a second control signal;

carrying said mixed stream to said location; and generating said first and second control signals as a function of the preselected temperature, the temperature of said heated first component stream, the temperature of the mixed stream and said temperature at said predetermined location.

Other objects of the invention will in part be obvious and will in part appear hereinafter. The invention, accordingly, comprises the processes involving the several steps and the relation and order of one or more of such steps with respect to each of the others, and the products possessing the features, properties and relation of components which are exemplified in the following detailed disclosure, and the scope of the application of which will be indicated in the claims.

For a fuller understanding of the nature and objects of the present invention, reference should be had to the following detailed description taken in connection with the accompanying drawing wherein:

FIG. 1 is a partial block and partial schematic diagram of the preferred embodiment of the present invention;

FIG. 2 is a graphical illustration of an example of a typical response of the appartus shown in FIG. 1;

FIG. 3 is a another graphical illustration of an example of another typical response of the apparatus shown in FIG. 1; and FIG. 4 is yet another graphical illustration of an example of another typical response of the apparatus shown in FIG. 1.

Referring to FIG. 1, the apparatus 10 generally comprises the fluid flow system 20 for continuously delivering a stream of pressurized fluid to a test site 22. Apparatus 10 also includes cooling system 24 and the heater 38 for respectively cooling and heating the stream as needed in order to establish and maintain the level of the temperature at the site 22 to a temperature preset by the operator of the apparatus. A control system 26 is also provided for sensing the temperature at various points in the fluid flow system 20 and controlling the cooling system, mixing valve 34 and heater 38 so that the operator's preset temperature is established and maintained at site 22 in response to the various temperatures sensed.

The fluid flow system 20 includes means, preferably in the form of a fan 30, for generating a stream of pressurized fluid, preferably air, at a flow rate, for example, of 30 cfm. The stream of air is directed through the fluid flow system 20 through an air conduit, generally indicated at 32. The system 20 is preferably a closed looped system so that the air is continuously recirculated therethrough. The air stream is directed from fan 30 through the air mixing valve 34. The latter is adapted to control the direction of air flow received from the fan 30 to the two conduit sections 32A and 32B. The sections 32A and 32B are respectively coupled to means, in the form of low temperature evaporator 36, for cooling the air stream provided in conduit section 32A, and means, in the form of heater 38, for heating the air stream provided in conduit section 32B.

More specifically, mixing valve 34 is designed to be positioned in a plurality of different positions and moved in response to and as a function of the electrical control signal received over the control line 128. The various positions of the valve are such that at one extreme position substantially all of the air is directed through conduit section 32A and thus the evaporator 36. In this position a relatively small amount of air is provided to the section 32B and thus the heater 38 for reasons which will be more apparent hereinafter. As the valve is moved toward its other extreme position, a greater proportion of the air is directed through the conduit section 32B and less through conduit section 32A until the valve is positioned its other extreme position wherein all of the air is directed through the section 32B and heater 38 and none through the section 32A and evaporator 36. Air mixing valves are well-known in the art, and thus valve 34 has not been described in greater detail. Preferably, the valve is of low thermal mass so that it will absorb little heat and offer little thermal inertia.

As will be more evident hereinafter, the evaporator 36, also part of the cooling system 24, cools the air passing through section 32A. The evaporator is of a type well-known in the art and thus will not be described in detail. Preferably, the evaporator is cooled by a low temperature refrigerant, such as those designated by the trade designations R13, R170 and R503 established by the American Society of Heating, Refrigeration and Air Conditioning Engineers (ASHRAE). The refrigerant is provided over the refrigerant line 44 of the cooling system 24, so that the air stream passing through the evaporator can be cooled to a temperature of about −70° C., although this can vary depending upon the application of the apparatus. Heater 38 can be any type of heater of well-known construction and providing sufficient output capacity (such as a resistance heater) for heating the air passing through the section 32B. The heater provides heat in response to the level of the power signal provided over power line 122 of the control system 26. The output of evaporator 36 and heater 38 are provided over the conduit sections 32C and 32D to the conduit junction 40 where the heated and cooled airstreams are fed into the conduit section 32E. The latter extends to test site 22.

The test site 22 may be a sealed chamber or container, or may be the on site location of a system to be tested.

The air is subsequently fed over line 32F to means, in the form of a high temperature evaporator 42, for pre-cooling the air under certain prescribed conditions described hereinafter. Preferably, the air passing through evaporator 42 is cooled with higher temperature refrigerant, such as those designated R12, R22 and R502 established by ASHRAE, provided over the refrigerant line 46 of cooling system 24. The airstream is returned through conduit section 32G to the fan 30.

The cooling system 24 in the preferred embodiment is a two stage refrigerant system including the low temperature evaporator 36 and high temperature evaporator 42. Generally, in accordance with standard refrigeration techniques, the higher temperature refrigerant circulated in the refrigerant line 46 and used in evaporator 42 forms the high temperature stage of the cooling system, and is used to cool the lower temperature refrigerant circulated in the refrigerant line 44 (used in evaporator 36), the lower temperature refrigerant forming the low temperature stage of the system.

In accordance with certain aspects of the present invention, however, the circulation of the two refrigerants are controlled in a manner described in greater detail hereinafter. Generally, the low temperature refrigerant stage includes a compressor 48 for condensing the low temperature refrigerant in line 44. The compressor 48 feeds the low temperature refrigerant through the condensor side of the interstage device 50. The refrigerant is then fed from the condensor 48 of the device 50 to the thermal expansion valve 52, which in turn is connected by the line 44 to the refrigerant input of evaporator 36. The thermal expansion valve 52 is of a type well-known in the art and generally controls the flow of the refrigerant as a function of the superheat of the refrigerant sensed by the sensor 54, disposed in the line 44 at the refrigerant output of the evaporator 36. When the system is operating, the refrigerant will pass through the the expansion valve 52 in a liquid phase, enter the evaporator where it absorbs heat from the airstream and exit from the evaporator in a gas phase, where it will remain until compressed back to the liquid phase by the interstage device 50. The sensor 54 controls the valve 52, which in turn controls the flow of the refrigerant to insure the proper amount of cooling is accomplished by the evaporator.

The high temperature stage of the cooling system 24 includes the compressor 60 which pumps the refrigerant through the refrigerant line 46. The compressor forces the refrigerant through the condensor 62 for insuring the condensation of the refrigerant in line 46, from which it passes through the thermal expansion valve 64, through the evaporator side of the interstage device 50. The refrigerant passes from the evaporator side of the interstage device 50 through the sensor 66 for controlling the thermal expansion valve 64, back to the compressor 60. The valve 64 and sensor 66 operate in a manner identical to the valve 52 and sensor 54 for insuring that the evaporator side of the interstage device 50 is providing sufficient cooling to the refrigerant flowing through the condensor side of the device 50.

The compressor also forces the high temperature refrigerant through the condensor 62 through the line 46 to the two selectively operable solenoid-operated valves 68 and 70 for controlling the amount of high temperature refrigerant flowing through the evaporator 42. The valves 68 and 70 are selectively open and closed in response to respective electrical signals provided over the electrical control lines 106 of the control system 26. Solenoid-activated valves 68 and 70 are operated in accordance with the following table:

| State of Evaporator 42 | Condition of Valve 68 | Condition of Valve 70 |
| --- | --- | --- |
| Off | Closed | Closed |
| Low (Minimum Cooling) | Closed | Open |
| High (Maximum Cooling) | Open | Closed |

The output of valve 68 is connected with the line 46 through thermal expansion valve 72 to the refrigerant input of the evaporator 42, while the valve 70 is connected through the capillary tube 74 to the refrigerant input of the evaporator 42. A sensor 76 at the refrigerant output of the evaporator 42 controls the expansion valve 72 in the same manner as sensors 54 and 66 control the valves 52 and 64, respectively, so as to insure that the evaporator 42 is properly cooling. The refrigerant passes from the sensor 76 through the evaporator pressure valve back to the input of the compressor. The compressor 60 thus pumps the refrigerant through two loops formed by the line 46, one through the evaporator 42 and the other through the evaporator side of the interstage device 50.

Referring now to the control system 26, the latter selectively controls the position of the mixing valve 34, the power level to the heater 38, and the operation of the solenoid valves 68 and 70 all for bringing the temperature to and maintaining the temperature of the test site 22 to the temperature set by the operator.

Control system 26 preferably includes three sensors 90, 92 and 94 for respectively measuring the temperature of the airstream at three different locations. Sensor 90 is positioned at the site 22 for measuring the temperature of the airstream at that location, sensor 92 is positioned in conduit section 32D at the output of the heater 38 before junction 40 and sensor 94 is positioned in conduit section 32E sufficiently downstream from the junction 40 where the airstreams from the evaporator 36 and heater 38 are thoroughly mixed.

Electrical input line 96 provides an electrical input signal representative of the temperature set by the operator. Line 96 is connected to the positive input of the summing junction 98. The negative input of junction 98 is connected to line 100, the latter being connected to transmit a signal from sensor 90 at site 22 representative of the temperature at the site.

The output of summing junction 98 (representative of the error E1 between the set point temperature $T_s$ and the site temperature T1 is provided to the logic unit 102 and the input of proportional integrator differentiator (PID) 104. Logic unit 102 also receives the signal from the sensor 90 over line 100.

The logic unit 102 is connected so as to control the solenoid-operated switches 68 and 70 and thus the evaporator 42 in response to the site temperature sensed by sensor 90 and the error E1 generated by junction 98. Specifically, the line 100 and the output of junction 98 are both connected to the inputs of logic unit 102, while the output of the latter is connected to the control lines 106.

Logic unit 102 is designed to first assume that the evaporator 42 is operating in its low state, i.e., valve 68 is closed and valve 70 is open. Next, if E1 is less than −10° C., i.e., the measured temperature at the site is more than 10° C. below the temperature set by the operator, the evaporator 42 is set to operate in its high state, i.e., solenoid valve 68 is open and valve 70 is closed. However, if the temperature T1 measured by sensor 90 at site 22 is less than −10° C. (indicating the site is too cold and, therefore, the use of the evaporator is unnecessary) the evaporator 42 is set to the off state, i.e., the valves 68 and 70 are both closed preventing refrigerant from flowing through the evaporator 42.

PID 104 provides an output signal K7 in accordance with the following:

$$K7_{new} = K7_{old} + (K1*E1 + K2*D1)/256 \qquad (1)$$

wherein $K7_{new}$ is the new value of K7;
$K7_{old}$ is the previous last value of K7;
K1 is a constant;
E1 is the current input signal from junction 98;
K2 is a constant; and
D1 is the difference between E1 (current) and the previous last value of E1.

The output of PID 104 is connected to the positive input of the summing junction 108. The latter is adapted to receive at its negative input on line 110 a signal T2 from the sensor 94 positional in the mixed airstream in conduit section 32E representative of the temperature of the mixed airstream. The output of junction 108 (providing a signal E2 equal to K7−T2) is applied to the input of PID 112 used for controlling the position of the mixing valve 34, and the input of PID 114 used for controlling the power delivered to heater 38 and also used to control the position of the mixing valve 34. PID 112 provides the output signal K6 derived from the following control function:

$$K8 = (X1*E2 + X2*D2)/256 \qquad (2)$$

wherein X1 is a constant;
E2 is the current input signal from junction 108;
X2 is a constant; and
D2 is the difference between E2 (current) and the previous last value of E2.

PID 114 provides the output signal K6 derived from the following control function:

$$K6_{new} = K6_{old} + (K3*E2 + K4*D2)/256 \qquad (3)$$

wherein $K6_{new}$ is the new value of K6;
$K6_{old}$ is the previous last value of K6;
K3 is a constant;
E2 is the current input signal from junction 108;
K4 is a constant; and
D2 is the difference between E2 (current) and the previous last value of E2.

It should be appreciated that the output of the PID 114 is the temperature set point for the heater 38. PID 114 can include means for setting the high and low limits of power delivered to the heater so that in the former case, the heater is prevented from getting too hot, and in the latter case, to allow a minimum amount of heat to the airstream passing through the heater to achieve better control and faster response times when the airstream must be heated. In this regard mixing valve 34 is constructed to always provide at least some minimum amount of air through the heater, as previously described.

The output of PID 114 is connected to the positive input of the summing junction 116. The latter is adapted to receive a signal T3 over line 118 from the sensor 92 at the airstream output of the heater 38. The output signal of summing junction will, therefore, be the error signal E3 equal to the difference between the output signal K6 from PID 112 and the temperature signal T3. The output E3 of the junction 116 is connected to the input of PID 120 for providing the power signal P to the heater 38 over the power line 122 and for providing an input signal to the logic unit 124. PID 120 operates to carry out the following control function:

$$P6_{new} = P6_{old} + (K9*E3 + K10*D3)/256 \qquad (4)$$

wherein $P6_{new}$ is the new value of P6;
$P6_{old}$ is the previous last value of P6;
K9 is a constant;
E3 is the current input signal from junction 108;
K10 is a constant; and
D3 is the difference between E3 (current) and the previous last value of E3.

It should be appreciated that PID controllers, such as PID 104, PID 112, PID 14 and PID 120 employ well known control techniques. For a discussion of PID controllers, see for example, Dorf, Richard C., *Modern Control Systems*, Third Edition, Addison Wesley Publishing Company, Reading, Mass. (1980) pp. 379–383.

The power level signal P is also applied to the input of the logic unit 124 for providing the current power level setting of the heater to the control loop for controling the position of the mixing valve 34. Unit 124 first determines the value of the variable P7 according to the following:

$$P7 = 50 - P \qquad (5)$$

unless P7 < −50, then P7 = −50.

The constant 50 is a constant chosen to represent a certain power level to the heater 38, e.g., 20% of maximum power. In this way, when the system demands a large amount of power to the heater 38 to raise the temperature of the airstream, a large amount, i.e., the value of P exceeds 100 (representive of 40% power) and P7 < −50, the value of P7 is set equal to −50, i.e., the power level is set at 40%. The P7/20 signal is applied to the negative input of the summing junction 126, the latter receiving at its positive input the output K8 of PID 112.

The output of summing junction 126 (providing signal Z1) is connected to the control line 128, which in turn is connected to the mixing valve 34. As will be evident from the foregoing, the signal Z1 is equal to K8-P7/20 or:

$$Z1 = (X1*E2 + X2*D2)/256 - P7/20 \qquad (6)$$

It will be appreciated that when the power signal P is large so that P7 = −50 (the power demanded for the heater 38 is greater that 40%), the signal Z1 on line 128 is allowed to change so that the mixing valve 34 causes more of the airstream to flow though the heater 38 and less through the evaporator 36. This results in the mixture of air passing through the section 32E to increase in temperature not only because of the heater 38, but also because a relatively greater amount of the airstream flows through the heater. This feature will conserve power while achieving a fast response. Unit 124 provides an output signal equal to P7/20.

It should be appreciated that the portion of the control system 26, including the junction 108, PID 114, junction 116, PID 120, heater 38 and two sensors 92 and 94, is similar to the control system used in the model 412 of the temperature controlled airstream system currently sold by Temptronic Corporation, the present assignee, and described in U.S. patent application Ser. No. 728,860, except that in the prior application one of the sensors is disposed in close proximity to the device under test, and thus the control functions of the PIDs are modified from those shown.

In operation, the apparatus 10 provides control of the temperature at site 22 in an energy efficient manner by controlling the power provided over line 122 to heater 38, the control signal provided over the control line 128 for controlling the position of the mixing valve 34 so as to control the relative amounts of the airstream of the airstream provided to the low temperature evaporator 36 and the heater 38, and the control signals to the solenoid-operated valves 68 and 70 for controlling the state of the high temperature evaporator 42.

In order to operate the apparatus 10 the operator first turns on fan 30 so as to generate the airstream. Next the temperature $T_s$ is set by the operator. For illustrative purposes, assume that the site temperature is initially at room temperature, i.e., about +25° C., and that the operator has set the system to operate at +60° C. This will result in the output signal E1 of the summing junction 98 going positive to a level representative of +35° C.

Logic unit 102 first assumes that the evaporator 42 is operating in its low state, i.e., valve 68 is closed and valve 70 is open. E1 (+35° C.) is not less than −10° C. The temperature T1 (+60° C.) measured by sensor 90 at site 22 is greater than −10° C. Logic 102, therefore, will generate the appropriate control signals to solenoid valves 68 and 70 so that the former is closed and the latter is open resulting in refrigerant being sent through the capillary tube 74 and then through the evaporator 42 so that the high temperature evaporator 42 operates in its low state and provides partial cooling.

The output of PID 104, K7, will begin to increase so that the temperature of the airstream can be increased. This results in E2 increasing from zero. An increase in E2 results in an increase to the PIDs 112 and 114. The latter provide an increasing signal K8 to the junction 126 and an increasing signal K6 resulting in an increasing temperature set point to the junction 116. Since the temperatures measured by sensors 92 and 94 are lower than indicated by the input temperature setting $T_s$ signal on line 96, the value E3 will be positive. The result will be increased power being delivered to the heater 38 and the mixing valve 34 adjusted so that a greater amount of the air stream being diverted through the heater 38 and less through the evaporator 36.

All of the sensors 90, 92 and 94 will sense rising temperatures resulting in the values of E1, E2 and E3 diminishing. The derivative terms provided in PIDs 104, 112, 114 and 120 prevent unreasonable overshoot of the system, and the temperature at site 22 as sensed by the sensor 90 will stabilize at +60° C.

As shown in FIG. 2, the curve 2A represents the change in temperature of the mixed air as detected by the sensor 94, while the temperature of the airstream changes at the site 22 (as detected by sensor 90) as indicated by curve 2B. The overshoot shown by the portion of curve 2A rising above +60° C. is a result of the derivative terms of the PIDs 104, 112, 114 and 124. The overshoot helps to raise the temperature at the site 22 more quickly to the +60° C. level, providing a fast response time and conserving energy.

Next, assume that the temperature is reduced by the operator from +60° C. to +25° C. This results in the value of E1= +25° C.−(+60° C.)= −35° C. Since E1< −10° C., the condition exists for setting the high temperature evaporator 42 in its high state. Accordingly, the logic 102 provides the necessary control signals over line 106 to the solenoid-actuated valves 68 and 70 so that valve 68 is open and valve 70 is closed. This results in the high temperature refrigerant flowing through expansion valve 72 and evaporator 42 to provide maximum use of the evaporator. Since E1 is negative, K7 is reduced, resulting in E2 going negative. PID 112 drives the output K8 down causing the mixing valve to be moved so as to increase the flow of the air stream through the evaporator 36 and decrease the flow through the heater 38. In addition, the negative E2 results in a negative E3 output of the junction 116 to the PID 120. The latter in turn results in a drop in power over line 122 to the heater 38 so as to reduce the amount of heat generated.

As the temperature at the site 22 drops from +60° C. toward +25° C., when it reaches +35° C. on its way to 25° C., the value of E1 will equal and then fall below −10° C. difference between $T_s$, the set temperature, and T1, the temperature of the airstream at site 22. As E1 falls below a −10° C. error, the output of logic 102 will cause the evaporator to switch from the high state to the low state of operation. Thus, the solenoid-operated valve 68 will close and valve 70 will open causing the refrigerant to flow through the capillary tube 72 before flowing through the high temperature evaporator 42.

As shown in FIG. 3, the curve 3A represents the change in temperature of the mixed air as deteted by the sensor 94, while the temperature of the airstream changes at the site 22 (as detected by sensor 90) as indicated by curve 3B. The overshoot shown by the portion of curve 3A dipping below 25° C. is a result of the derivative terms of the PIDs 104, 112, 114 and 120. The overshoot helps to bring the temperature at the site 22 down more quickly to the 25° C. level, providing a fast response time and conserving energy.

Finally, for illustration purpose, assume the system has stabilized at +25° C. The operator now sets the set temperature $T_3$ to −50° C. This results in E1 dropping to a value representative of −50° C.−(+25° C.), or −75° C. Logic unit 102 will set the high temperature evaporator to a high state, wherein the solenoid-actuated valve 68 will open and the valve 70 will close resulting in the refrigerant flowing through the thermal expansion valve 72 prior to flowing though the evaporator 42. Since E1 equals −75° C., K7 will go down, resulting in E2 going negative. The values of K6 and K8 will go down resulting in the mixing valve 34 being moved to allow more of the airstream through the evaporator 36 and less through the heater 38. As shown in FIG. 4, when the site temperature, as sensed by sensor 90, reaches −10° C., the logic unit 102 changes the state of the high temperature evaporator 42 from the high state to the off state, wherein both of the solenoid-actuated valves 68 and 70 are closed. This provides assurance that as the temperature continues to drop refrigerant will not collect in the evaporator 42, which in turn could cause the refrigeration system to go into oscillation. As shown in FIG. 4, as in FIGS. 2 and 3, the overshoot provided by the differentiators in the PIDs 104, 112, 114 and 120 results in the temperature at site 22 stabilizing at the −50° C. set temperature relatively quickly.

The control system 26 and the above-identified control functions of the logic units 102 and 124, and PIDs 104, 112, 114 and 124 are preferably performed by an external controller, such as a personal computer Model HP-85 manufactured by Hewlett Packard of California, as described in prior U.S. patent application Ser. No. 728,860 with a parallel interface bus, such as a IEEE-488 option, sold as the HPIB. The added external computer and IEEE-488 option provides both an external controller to vary the temperature set point provided on line 96, and readings of the temperatures sensed by sensors 90, 92 and 94.

The apparatus 10 provides an improved system for establishing and maintaining the temperatures of an airstream at the site 22 with relative fast temperature transition times between the time the new temperature is set by the operator and the time the new temperature is reached and the system stabilized at the new temperature. The use of the three sensors 90, 92, and 94 provide better control of the temperature of the airstream. The use of logic unit 102 and the solenoid operated valves 68 and 70 to control the states of the high temperature evaporator 42 helps reduce the thermal stress on that evaporator. The provision of the control system 26 for controlling the position of the mixing valve 34 for determining the correct mix of the two airstreams flowing through the low temperature evaporator 36 and heater 38, respectively, makes more efficient use of energy. Further, energy consumption is reduced using the mixing valve to cause proportionately more of the airstream to flow through the heater 38 than the low temperature evaporator 36 when the power provided to the heater 38 exceeds a predetermined level, e.g., 40% of maximum of power.

Certain changes may be made in the above apparatus and processes without departing from the scope of the invention. For example, while the cooling system 24 has been shown as a two stage cooling system, the latter can be a single stage system or include three or more stages depending upon the requirements of the apparatus.

Since certain other changes may be made in the above apparatus and processes, without departing from the scope of the invention herein involved, it is intended that all matter contained in the above description or shown in the accompanied drawing shall be interpreted in an illustrative and not in a limiting sense.

What is claimed is:

1. Apparatus for precisely controlling the temperature at a predetermined location at a preselected temperature selected from a range of temperatures, said apparatus comprising:
    means for generating a pressurized stream of fluid;
    means for separating said stream into first and second component streams;
    heating means responsive to a first control signal for heating said first component stream;
    cooling means for cooling said second component stream;
    mixer means for mixing said first and second component streams so as to provide a mixed stream;
    control means, responsive to a second control signal, for controlling the amount of mixing of said first and second component streams;
    means for carrying said mixed stream to said location; and
    signal generating means for generating (1) said first and second control signals, wherein said first control signal is a power signal provided to said heating means and is generated as a function of the preselected temperature, the temperature of said first component stream downstream from said heater means, the temperature of said mixed stream and said temperature at said predetermined location, and (2) said second control signal is generated as a function of the preselected temperature, the temperature of said mixed stream and said temperature at said predetermined location, said signal generating means including means for setting a maximum limit of said power signal;
    wherein said control means includes means, responsive to said power signal when said power signal exceeds said maximum limit, for generating said second control signal so as to modify said mixed stream by modifying the relative amounts of said first and second component streams and so as to reduce the power otherwise required by said heating means.

2. Apparatus according to claim 1, wherein said means for separating said stream into said first and second component streams comprises a mixing valve movable between a first extreme position wherein substantially all of said stream is diverted into said first component stream and a second extreme position wherein substantially all of said stream is diverted into said component stream and intermediate positions in between said first and second extreme positions wherein said said stream is separated into said first and second component streams in preselected proportions.

3. Apparatus according to claim 1, wherein said means for generating said second control signal is coupled to said means for separating said stream into said first and second components so as to divert more of said stream into said first component stream and less into said second component stream.

4. Apparatus according to claim 1, further including means for returning said mixed stream to said means for generating said stream so that said stream is recirculated through said apparatus.

5. Apparatus according to claim 4, wherein said means for returning said mixed stream includes second cooling means for recooling said mixed stream.

6. Apparatus according to claim 5, wherein said first cooling means and said second cooling means are provided by two-stages of a multiple stage cooling system.

7. Apparatus according to claim 5, wherein said signal generating means generates a third control signal as a function of the preselected temperature and the temperature at said predetermined location and said second cooling means is responsive to said third control signal so as to function in at least two function modes, wherein said second cooling means is inoperative in one of said function modes when the temperature at said predetermined location is below a predetermined value and operative in the second of said modes for cooling said mixed stream when the temperature at said predetermined location is above said predetermined value.

8. Apparatus according to claim 5, wherein said signal generating means generates a third control signal as a function of the preselected temperature and the temperature at said predetermined location and said second cooling means is responsive to said third control signal so as to function in at least three function modes, wherein said second cooling means is inoperative in one of said function modes when the temperature at said predetermined location is below a predetermined value and operative in the second and third function modes when said the temperature at said predetermined location is above said predetermined value, said second cooling means being adapted to operate to partially recool said mixed stream in said second function mode when the temperature difference between the preselected temperature and the temperature at said location is less than a predetermined value, and adapted to operate to provide maximum recooling of said mixed stream in said third function mode when said temperature difference is greater than said predetermined value.

9. Apparatus according to claim 8, wherein said second cooling means includes a high temperature evaporator and a capillary tube and means responsive to said third control signal for controlling the flow of refrigerant through said evaporator in said second and third function modes and through said capillary tube in said second function mode.

10. A method of precisely controlling the temperature at a predetermined location at a preselected temperature selected from a range of temperatures, said method comprising the steps of:
generating a pressurized stream of fluid;
separating said stream into first and second component streams;
heating said first component stream in response to a first control signal, wherein said first control signal is a power signal provided for heating said first component stream;
cooling said second component stream;
mixing said first and second component streams so as to provide a mixed stream;
controlling the amount of mixing of said first and second component streams in response to a second control signal;
carrying said mixed stream to said location; and
generating (1) said first control signal as a function of the preselected temperature, the temperature of said heated first component stream, the temperature of the mixed stream and said temperature at said predetermined location, and (2) said second control signal as a function of the preselected temperature, the temperature of said mixed stream and said temperature at said predetermined location, wherein said step of generating said first control signal includes the step of comparing said power signal to a predetermined maximum limit and said step of controlling the amount of mixing includes a step of adjusting the relative amounts of said first and second component streams mixed during said step of controlling the amount of mixing so as to substantially limit the power required for heating said first component to said maximum limit.

11. A method according to claim 10, wherein said step of separating said stream into said first and second component streams comprises the step of controlling the relative amount of said stream diverted to said first and second component streams.

12. A method according to claim 10, wherein said step of adjusting said relative amounts of said first and second component streams includes the step of diverting more of said stream into said first component stream and less of said stream into said second component stream when said power signal exceeds said maximum limit.

13. A method according to claim 10, further the step of recirculating said mixed stream.

14. A method according to claim 13, wherein said step of recirculating said mixed stream includes the step of recooling said mixed stream.

15. A method according to claim 14, wherein said steps of cooling said second component stream and recooling said mixed stream includes two-stages of a multiple stage cooling process.

16. A method according to claim 14, further including the step of generating a third control signal as a function of the preselected temperature and the temperature at said predetermined location and said step of recooling said mixed stream is in response to said third control signal so that said step of recooling is only performed when the temperature at said predetermined location is above some predetermined value.

17. A method according to claim 16, further including the step of recooling said mixed stream includes the alternative steps of partially recooling said mixed stream when the temperature difference between the preselected temperature and the temperature at said location is less than a predetermined value, and the step of maximally recooling the mixed stream when said temperature difference is greater than the predetermined value.

18. A method according to claim 17, wherein said step of recooling said mixed stream includes passing said mixed stream through a high temperature evaporator and said step of partially recooling said mixed stream includes the step of passing the refrigerant of said evaporator through a capillary tube.

* * * * *

UNITED STATES PATENT AND TRADEMARK OFFICE
CERTIFICATE OF CORRECTION

PATENT NO. : 4,784,213

DATED : November 15, 1988

INVENTOR(S) : George Eager, Thomas J. Schey, and Peter Selverstone

It is certified that error appears in the above-identified patent and that said Letters Patent is hereby corrected as shown below:

Claim 2, column 12, line 34, after "said" (second occurrence) insert -- second --.

Claim 2, column 12, line 36, delete "said" (third occurrence).

Claim 8, column 13, line 9, delete "said".

Claim 13, column 14, line 21, after "further" insert -- including --.

Signed and Sealed this

Twenty-eighth Day of March, 1989

Attest:

DONALD J. QUIGG

*Attesting Officer*     *Commissioner of Patents and Trademarks*